July 27, 1948.  W. W. KUYPER  2,446,013

COMBUSTION CHAMBER DRAIN ARRANGEMENT

Filed May 31, 1945

Inventor:
William W. Kuyper,
by *Darrell S. Mack*
His Attorney.

Patented July 27, 1948

2,446,013

UNITED STATES PATENT OFFICE 2,446,013

COMBUSTION CHAMBER DRAIN ARRANGEMENT

William W. Kuyper, Schenectady, N. Y., assignor to General Electric Company, a corporation of New York Application May 31, 1945, Serial No. 596,955

2 Claims. (Cl. 60—44)

This invention relates to hot gas generators for thermal power plants, particularly to combustion chamber arrangements used in connection with gas turbines and similar energy converting apparatus. It finds particular usefulness in connection with gas turbine power plants used for the propulsion of aircraft.

In connection with internal combustion gas turbines for the jet propulsion of aircraft, it has been found that when the engine is shut down after a period of operation a certain amount of unburned liquid fuel may collect at the lowest point of each combustion chamber or "combustor." In engines having a number of combustors connected together, a quite considerable amount of fuel may collect in the lowermost combustors as a result of drainage from those above. This condition may also occur in the event of a "false start," in which the starting cycle of the engine is performed but satisfactory combustion does not begin. If then an attempt is made to start a gas turbine jet engine with such a residue of liquid in one or more of the combustors, irregular combustion may take place initially with long flames being ejected through the tailpipe and propulsion nozzle. Such flaming is a serious safety hazard, both for the airplane and for personnel in the neighborhood.

An object of my invention is to provide means for automatically draining from the combustors of a thermal power plant any residual liquids which may collect in the combustors when the power plant is inoperative, so as to prevent the above described flaming.

Another object is to provide an automatic combustion chamber drain means which is simple, reliable, and requires no attention whatever from the operating personnel.

Figure 1:
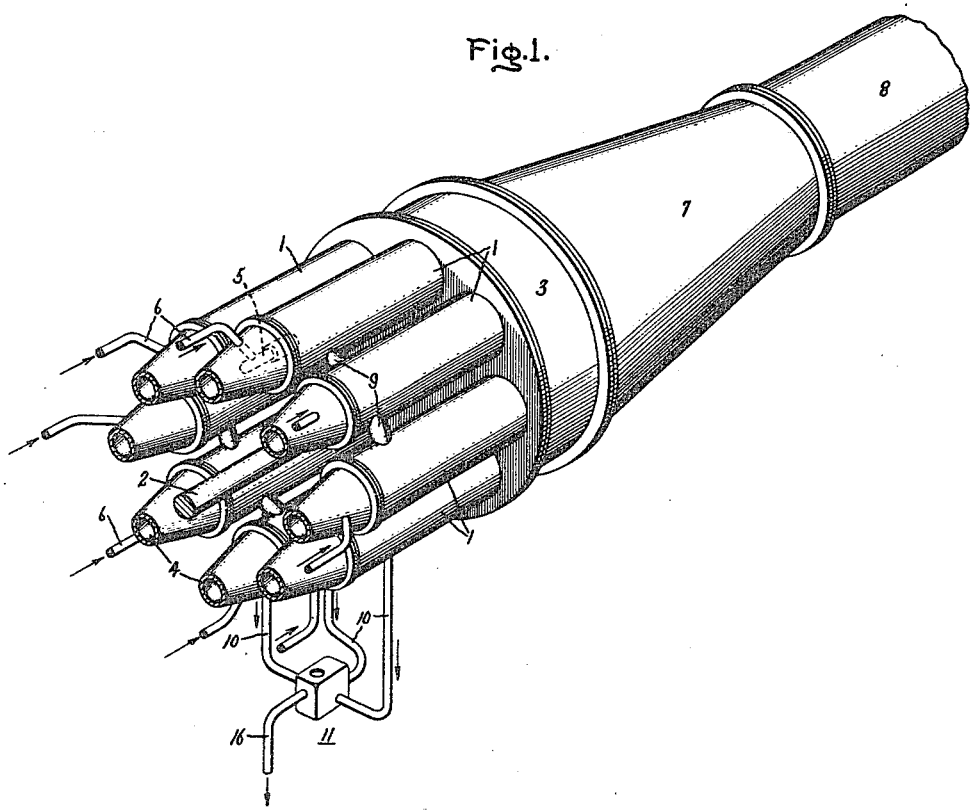
Figure 2:
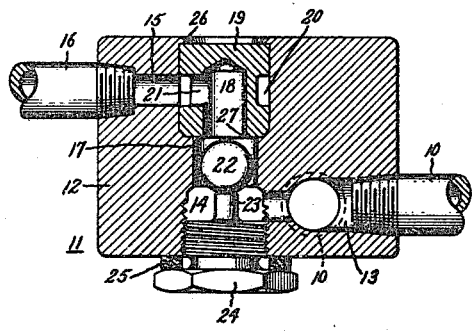

Further objects and advantages will be readily apparent from the following description, taken in connection with the accompanying drawing, in which Fig. 1 is a perspective schematic view of a thermal power plant embodying my invention; and Fig. 2 is a sectional view of an automatic valve particularly suitable for use in accordance with my invention.

Referring to Fig. 1, a number of combustion chambers or combustors 1 are arranged with their axes substantially parallel radially spaced from and circumferentially spaced around a rotatable shaft 2, which is supported in suitable bearings (not shown), and secured at one end to a gas turbine bucket wheel contained within the housing 3.

Combustion air under pressure is supplied to the inlet openings 4 in the ends of the respective combustors from any suitable source, such as an air compressor (not shown) which may be driven from the shaft 2 in a well-known manner. A suitable fluid fuel is supplied through fuel lines 6 to a nozzle or burner 5 in each combustor. Exhaust gases discharged from the turbine casing 3 pass through the tailcone 7 and tailpipe 8 to an exhaust or propulsion nozzle (not shown).

The ring of combustors 5 are connected together by short conduits or "cross-ignition tubes" 9, the function of which is to equalize the pressure in all the combustors and to permit flame in one chamber to be communicated to the adjacent chambers. With this arrangement it is necessary to have only one or two spark plugs in order to initiate combustion in all the chambers.

It should be understood that the power plant shown in Fig. 1 is intended to be only a rough representation of the general arrangement of one type with which my invention may be used. The mechanical details of the combustors 5 may be in accordance with those shown in an application Serial No. 750,015, filed May 23, 1947, a continuation of Serial No. 501,106, filed in the name of Anthony J. Nerad on September 3, 1943, and assigned to the assignee of the present application. (Application Serial No. 501,106 is now abandoned.) The power plant may be arranged as in application Serial No. 506,930, filed in the name of Alan Howard on October 20, 1943, and also assigned to the assignee of the present application. The arrangement and details of the cross-ignition tubes may be as shown in application Serial No. 525,391, filed in the name of Dale D. Streid on March 7, 1944, now Patent No. 2,432,359, and assigned to the same assignee.

In accordance with my invention the means for draining residual liquids from the combustors comprises conduits 10 connected to the lowermost point of each of the lower combustors and communicating with automatic chamber drain valve 11, which is shown more in detail in Fig. 2.

The automatic chamber drain valve consists of a housing 12 having a plurality of inlet ports 13 communicating with a common inlet chamber 14. An outlet port 15 has associated with it a single drain line 16, which may lead to the exterior of the engine nacelle or to any other place where the drainage may be safely discharged to atmosphere or accumulated in a suitable receiver maintained at substantially the pressure of the ambient atmosphere.

The inlet chamber 14 is connected with the outlet port 15 by a passage including a cylindrical bore 17, an axial hole 18 drilled in the plug 19, an annular groove 20 cut in the outer surface of plug 19, and one or more radial holes 21 communicating between the groove 20 and the drilled hole 18.

The lower end of the bore 18 has an edge portion 27 which forms the valve seat for a ball-check member 22. When the power plant is not in operation the pressure inside the combustors will be atmospheric pressure, and there will be no pressure differential tending to cause flow of fluid through the drain lines 10 past the ball-check 22 to the drain conduit 16. Therefore, the ball 22 will be biased by gravity to its lower position determined by the stop projection 23 formed on the end of the threaded plug 24. A suitable gasket 25 prevents leakage through the threads of the plug 24.

It will be obvious to those skilled in the art that the fluid passages through the valve housing may be arranged in many equivalent ways. For instance, the seat for the ball-check member 22 may be machined directly in the housing 12. However, I prefer to make the housing of light metal such as aluminum or magnesium, in which case it is desirable to provide the plug member 19 of bronze, steel, or some other suitable material having the required wear-resisting qualities. It will be apparent that the plug 19 may be secured in the housing 12 in many different ways, as for instance by a threaded connection, or by brazing or soldering. In Fig. 2 the plug is represented as being secured in place by simply spinning or peening the edge 26 of the recess in the housing 12 so as to form a rim or series of projections engaging the top surface of the plug to hold it in place.

The operation of my chamber drain valve arrangement will be apparent from the above description. When the power plant is inoperative there is no pressure differential between the combustors and ambient atmospheric pressure; therefore, there is no flow of fluid through the lines 10 to the automatic valve 11. When the power plant is put into operation and combustion takes place in the hot gas generators, the pressure inside will rise considerably above ambient atmospheric pressure, and air or an air-fuel mixture will begin to flow rapidly through the pipes 10 to the inlet chamber 14, through the clearance between ball member 22 and bore 17, to passages 18, 21, 20, 15 and drain conduit 16. The ball-check member 22 is carefully designed to have such a weight, shape and size relative to the bore 17 as to be moved upwardly when the pressure differential reaches a predetermined value, into sealing engagement with the seat 27. By suitable design and selection of material for the ball-check member 22, it may be made to move upwardly into sealing engagement with seat 27 at any desired pressure differential. Thus during operation of the power plant, check member 22 is held in closed position by the pressure of the gases inside the combustors, and loss of pressure fluid through the drain system is prevented.

When the power plant ceases operating, the fluid pressure inside the combustors rapidly falls until a critical differential relative to ambient atmospheric pressure is reached, at which value gravity returns the ball 22 to its lower position against stop 23, thus opening the flow path through the drain valve. If there remains any unburned fuel or other liquid in the combustion chambers, such liquid will pass from the upper combustors downwardly through the cross-ignition tubes 9 to the lowermost combustors and through the respective drain lines 10 to the automatic valve 11 and drain conduit 16. It will be apparent that if the cross-ignition tubes 9 communicating between the combustors are not used, then drain conduits 10 must be provided for each chamber. The characteristics of the ball-check member 22 must of course be so selected that the pressure of a column of liquid extending from the valve 11 vertically upward in the lines 10 will not produce a sufficient head to cause the ball 22 to move to closed position. Thus it will be seen that the design of the automatic valve and check member 22 must be carefully coordinated with the arrangement of the power plant, particularly with respect to the liquid head which the arrangement of the engine installation might permit to be imposed upon the valve.

While I have disclosed a particularly advantageous form of automatic valve, it will be obvious that other equivalent valves responsive to the fluid pressure in the combustors might also be used. Although my invention has been described as applied to a gas turbine power plant for the jet propulsion of aircraft, it will be obvious that it may be equally applicable to rocket type engines in which oxygen and a suitable fluid fuel are carried in self-contained reservoirs from whence they are supplied to the combustors.

What I claim as new and desire to secure by Letters Patent of the United States, is:

1. In a thermal power plant including a plurality of substantially cylindrical hot gas generators with their axes substantially parallel and arranged to discharge into a common energy converting device, means associated with each generator for burning liquid fuel therein and cross-ignition flame tubes connecting the generators, the combination of means for automatically draining residual liquid from all the generators, said drain means including a valve with a housing having a single discharge port and a plurality of inlet ports, conduit means connecting the lowermost chambers with the respective inlet ports, and a check member in the housing biased to open position and arranged to shut off the flow of fluid from the inlet ports to the drain port when moved to closed position during operation of the power plant by the pressure of the fluid in the generators.

2. In a thermal power plant, the combination of a plurality of hot gas generators, each having a combustion space and means adapted to burn fluid fuel therein under pressure, cross-ignition flame tubes connected to the generators and communicating between the respective combustion spaces, said tubes being adapted to drain residual liquid from the upper generators to the lowermost ones thereof, and means for automatically draining said residual liquid from the generators including a single valve with a housing having a discharge port and a plurality of inlet ports, conduit means connecting the combustion spaces of said lowermost generators with the respective inlet ports, and a check member in the housing, said member being biased by gravity to open position and adapted to remain open under the influence of the maximum possible head of liquid extending from the valve upwardly to the generators, said member being also adapted to move under the influence of fluid pressure in the generators during normal operation to interrupt the flow of fluid from the inlet ports of the valve to the discharge port.

WILLIAM W. KUYPER.

REFERENCES CITED

The following references are of record in the file of this patent:

UNITED STATES PATENTS

| Number | Name | Date |
|---|---|---|
| 186,533 | Boldemann | Jan. 23, 1877 |
| 369,032 | Richards | Aug. 30, 1887 |
| 934,286 | Cole | Sept. 14, 1909 |
| 1,063,164 | McCumber | May 27, 1913 |
| 1,820,138 | Hargis | Aug. 25, 1931 |